April 29, 1958

C. E. ADAMS 2,832,221

PRESSURE DIFFERENTIAL INDICATOR

Filed April 21, 1953

INVENTOR.
CECIL E. ADAMS
BY
Herschel C. Omohundro
attorney

April 29, 1958      C. E. ADAMS      2,832,221
PRESSURE DIFFERENTIAL INDICATOR

Filed April 21, 1953      2 Sheets-Sheet 2

INVENTOR.
CECIL E. ADAMS
BY
*Herschel C. Omohundro*
attorney

United States Patent Office 2,832,221
Patented Apr. 29, 1958

2,832,221

PRESSURE DIFFERENTIAL INDICATOR

Cecil E. Adams, Columbus, Ohio, assignor, by mesne assignments, to American Brake Shoe Company, New York, N. Y., a corporation of Delaware Application April 21, 1953, Serial No. 350,111

5 Claims. (Cl. 73—419)

This invention relates generally to hydraulics and is more particularly directed to measuring apparatus used in testing hydraulic equipment during manufacture and use.

An object of the invention is to provide an apparatus for measuring the pressure differences existing in two portions of a hydraulic system such as on opposite sides of a restriction or orifice disposed in a fluid conductor.

Another object of the invention is to provide an apparatus for determining the pressure differential caused by a restriction in a fluid conductor which will permit the use of a gage with relatively coarse graduations so that the pressure will be accurately indicated yet the gage will be subjected only to relatively low safe pressures which will not prematurely destroy or render the gage unfit for further use.

A still further object of the invention is to provide a pressure differential measuring apparatus formed for connection in a fluid line, the apparatus including a body with an orifice of known characteristics, the body including piston means exposed to fluid pressures at the inlet and outlet sides of the orifice and having a passage in which fluid at the pressure equal to the difference in pressures between the inlet and outlet sides of the orifice exists, the body being provided with means for receiving a gage to communicate with such passage to indicate the pressure existing therein.

A further object of the invention resides in providing a measuring apparatus of the type specified in the preceding paragraph, the gage being graduated and provided with legends to indicate gallonage whereby the apparatus may be employed as a flow meter.

A further object is to provide a measuring apparatus having a body with a passage formed for connection with a fluid conductor, the passage containing an orifice and the body containing a plurality of pistons of equal cross-sectional areas, one of the pistons being exposed at one end to the pressure at the inlet side of the orifice and another piston being exposed at one end to the pressure existing at the outlet side of such orifice, these pistons being disposed in engagement with one another so that the movement in response to the pressures from the conductor will be in the opposite direction, a third piston being disposed in engagement with the piston exposed to the pressure at the inlet side of the orifice, the third piston being exposed to pressure supplied thereto through a passage containing a metering valve operated in response to movement of one of the other pistons, the third piston being arranged to move in the same direction as the piston exposed to the pressure of fluid at the outlet side of the orifice, the passage conducting the fluid to the third piston communicating at a point between the metering valve and the third piston with a connection for a pressure gage.

Another object is to provide a pressure differential measuring apparatus of the type specified in the preceding paragraph with a passage communicating with the passages carrying fluid to the third piston and exhaust, a relief valve being disposed in the passage so that, in the event excessive pressure is supplied to such passage, the excess pressure will be directed to exhaust and will not injure the gage communicating with such passage.

Further objects and advantages of the present invention will be apparent from the following description, reference being had to the accompanying drawings wherein a preferred form of embodiment of the invention is clearly shown.

Figure 3:
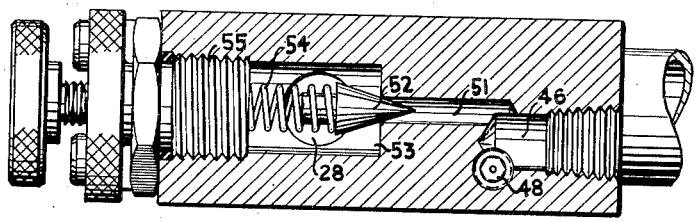
Fig. 3 is a horizontal sectional view taken through the apparatus on the plane indicated by the line III—III of Fig. 1.
Figure 5:
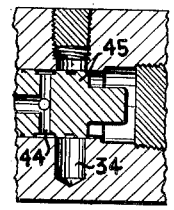
Fig. 5 is a detail horizontal sectional view taken through a metering valve forming part of the apparatus, the plane of this section being indicated by the line V—V of Fig. 1.

Referring more particularly to the drawing, the numeral 20 designates the pressure differential measuring apparatus in its entirety. In the present adaptation of the invention, the apparatus 20 includes a rectangular body 21 formed at its lower portion with threaded openings for connecting the body in a fluid conductor 22. Between the threaded connections, the body is provided with a passage in which an orifice plug 23 is removably positioned. This orifice plug could be made a part of the body 21 if it is desired to have the measuring apparatus limited to the use of one size of orifice. As illustrated, however, plug 23 is made removable so that different size orifices 24 may be provided. Body 21 is formed with a plurality of parallel bores 25, 26 and 27, the bore 25 entering the body from one side and the bores 26 and 27 entering from the opposite side. Bores 26 and 27 are spaced on either side or above and below the axis of the bore 25 so that inner ends of these bores will intersect or overlap the bore 25 and engage one another. The inner ends of bores 26 and 27 communicate with a bore 28 extending into the body from the upper end, this bore being threaded at the upper end for connection with a line 30 leading to a hydraulic reservoir.

Fluid passages 31 and 32 extend from the outer end portions of the bores 25 and 26, respectively, to the openings formed in the lower portion of the body 21, passage 31 communicating with the bore at one side of the orifice 24 while passage 32 communicates therewith at the other side. The body 21 is also provided with a passage 33 formed by a plurality of bores 34, 35 and 36, the bore 34 extending into the body to intersect the bore 25, bores 35 and 36 extending into the body to connect with bore 34 and conduct fluid from such bore to one end portion of bore 27, the end of the body in which bores 26 and 27 enter being provided with a cap 37 to close the open ends of these bores. This end of the body has a short groove 38 formed therein to establish communication between the bore 36 and the bore 27.

Bores 25, 26 and 27 are formed to receive piston elements 40, 41 and 42, respectively. These piston elements preferably have equal cross-sectional areas, the pistons 41 and 42 having their inner ends in engagement with the inner end of the piston 40, this engagement taking place in the vertical bore 28 and thus exposing the inner ends of these pistons to pressure of the reservoir or atmospheric pressure. The piston 40 is formed adjacent one end with a spool type valve head 45 which is disposed adjacent the bore 34 and is of a width slightly less than the diameter of the bore 34. This valve serves as a metering device to limit the communication between the bore 25 and the bore 34. The piston 25 has an internal passage 43 and lateral passages 44 which connect a groove at one side of the metering head 45 with bore 28 and exhaust.

Figure 1:
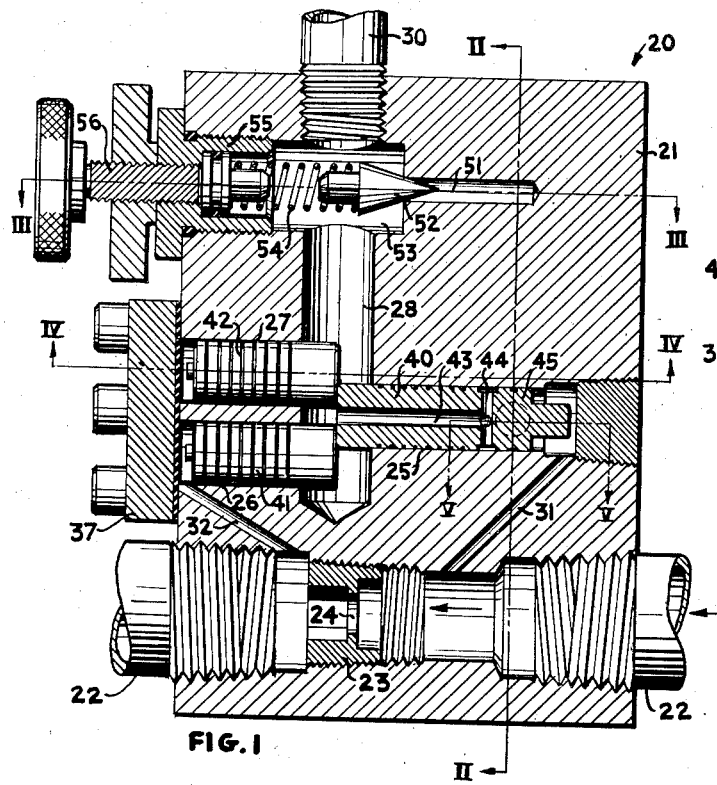
Fig. 1 is a vertical longitudinal sectional view taken through a pressure differential measuring apparatus formed in accordance with the present invention.
Figure 2:
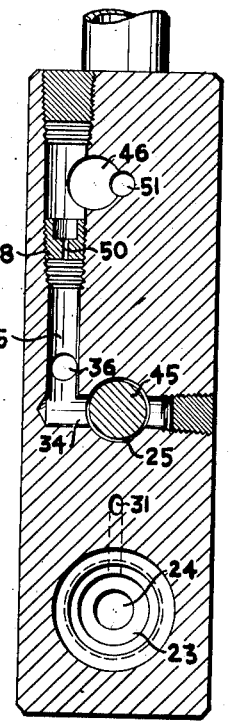
Fig. 2 is a vertical transverse sectional view taken through the apparatus on the plane indicated by the line II—II of Fig. 1.
Figure 4:
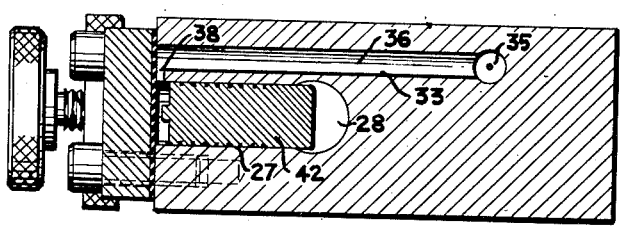
Fig. 4 is a similar view taken through the apparatus on the plane indicated by the line IV—IV of Fig. 1.

In the operation of the mechanism, fluid flowing through conduit 22 must flow through the orifice 24, this orifice causing a pressure drop on the fluid flowing therethrough. Fluid at the pressure existing in the conduit at the inlet side of the orifice is conducted through passage 31 to bore 25 and is applied to the end of the piston 40. Since this piston 40 is exposed at its opposite end to atmospheric or exhaust pressure in bore 28, fluid admitted through passage 31 will tend to move piston 40 toward the left, as viewed in Fig. 1, or toward the bore 28. Fluid at the outlet side of the orifice 24 is admitted through passage 32 to the end of the bore 26 and is applied to one end of the piston 41. Since the other end of this piston 41 is also exposed to exhaust pressure in bore 28, fluid admitted through passage 32 will tend to move this piston 41 toward the right as viewed in Fig. 1. This movement of piston 41 will tend to oppose the movement of piston 40 but, due to the greater pressure at the inlet side of the orifice, the resulting movement of the pistons will be toward the left. This movement is opposed by fluid pressure supplied to one end of the piston 42.

In the present instance, fluid supplied to piston 42 is secured from the passage 22 at the inlet side of the orifice 24, this fluid flowing through passage 31, the outer end portion of bore 25 and passage 33. Since the total area of pistons 41 and 42 is twice that of piston 40, uncontrolled fluid pressure applied to pistons 41 and 42 would tend to cause piston 40 to move toward the right or in a reverse direction. Movement of piston 40 forwardly or toward the left causes the metering valve to admit fluid to bore 27 and piston 42. Movement of piston 40 and valve 45 a sufficient distance toward the right interrupts this application of fluid and establishes a connection between the end of bore 27 and exhaust. Piston valve 45 thus becomes a metering valve and will admit only the fluid pressure necessary to maintain piston 40 in a balanced condition in which valve head 45 is centered across bore 34 admitting and/or exhausting the proper amount of fluid pressure to piston 42 to maintain this condition. This condition will be maintained irrespective of the fluctuation in the pressure in conduit 22. Passage 33 will, therefore, contain fluid at a pressure equal to a difference in pressure between the inlet and outlet sides of the orifice 24. While the fluid is supplied to piston 42 from the conduit at the inlet side of the orifice 24, it should be obvious that this fluid may be supplied from any other source, the only requirement being that the metering valve 45 be responsive to the movement of the piston assembly or a component part thereof to control the admission of fluid under pressure to the piston 42.

Provision for measuring the fluid pressure existing in passage 33 is made by forming another bore 46 in body 21. This bore communicates with bore 35 and is provided with threads for the reception of a suitable pressure gage 47. This gage may be graduated and, if desired, calibrated to indicate either pounds per square inch or gallons per unit of time depending upon the use to which the apparatus is to be placed. To protect the gage against undue pressure fluctuations, passage 35 is provided with a plug 48 in which an orifice 50 is formed. This orifice prevents the sudden rush or surge of fluid pressure to the bore 46 communicating with the pressure gage.

The gage is also protected by providing the body 21 with another bore 51 which also connects with bore 35 and also with bore 28 forming the exhaust passage. Bore 51 is normally closed by a spring-pressed conical valve 52 engaging a seat formed by the edge of the bore 51 at a counterbore 53. This counterbore contains the spring 54 and is closed by a plug 55 in which an adjusting screw 56 is threaded, this adjusting screw serving to vary the force applied to the valve by spring 54. Under normal conditions, valve 52 is closed but, in the event the pressure in the passage 33 should exceed a predetermined maximum, valve 52 will open and permit the excess pressure to be vented to exhaust. Since passage 33 will contain fluid at the pressure difference between the inlet and outlet sides of the orifice, the gage communicating with such passage need not be a high pressure gage but one of comparatively low pressure having relatively coarse graduations. These coarse graduations will provide accurate indications of the pressure existing in passage 33. These coarse graduations on the gage may be provided with suitable indicia to indicate either the pressure drop caused by the orifice or the quantity of fluid flowing through the conduit 22.

While a plurality of pistons 40 to 42, inclusive, have been illustrated, this piston assembly is capable of modification in various ways without departing from the spirit of the invention. It is desired to reserve the rights to all forms of piston means capable of operating the metering valve to control the application of fluid pressure to the piston assembly to create a pressure balance at opposite ends thereof.

Figure 6:
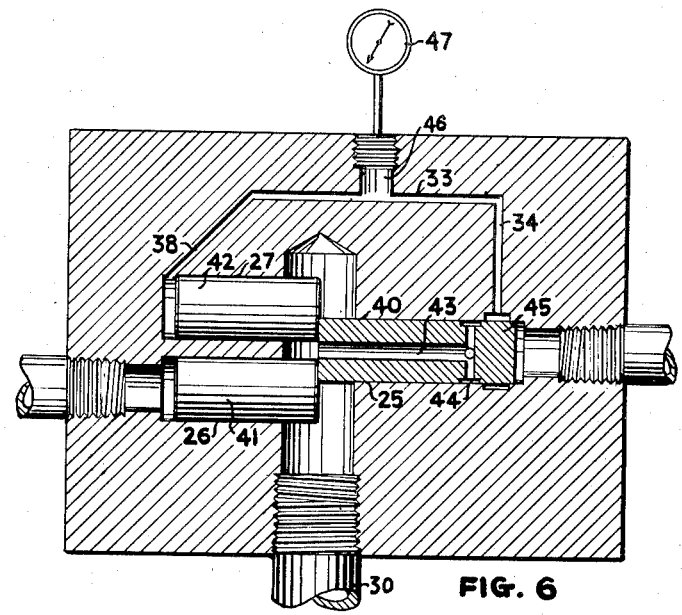
Fig. 6 is a diagrammatic view illustrating the operating principles and essential elements of the invention.

Attention is also directed to the fact that the invention is suitable for measuring pressure differences in portions of fluid systems other than on opposite sides of an orifice in a conductor. For example, the essential elements of the invention are diagrammatically illustrated in Fig. 6. These essential elements are the piston assembly to which the differing pressures and the supplemental balancing pressures are applied, a valve operated by the movement of a part of the piston assembly to control the application of the balancing pressure to the piston assembly and a gage or similar device for measuring the pressure of the fluid required to balance the piston assembly.

The apparatus of the invention is suitable for measuring the difference between two fluid pressures wherever they exist whether in the same conduit, the same system or a plurality of separate systems.

While the form of embodiment of the present invention as herein disclosed constitutes a preferred form, it is to be understood that other forms might be adopted, all coming within the scope of the claims which follow.

I claim:

1. A pressure differential measuring apparatus including a conductor for fluid; a flow restrictor in said conductor; a first piston means having oppositely facing end surfaces of equal area, said first piston means being supported for movement in response to differences in pressures applied to such end surfaces; passage means for applying the pressure in said conductor at the inlet side of said flow restrictor to one end of said piston means and the pressure at the outlet side of said flow restrictor to the other end of said piston means; additional longitudinally movable piston means having one end area equal to that of one of the end areas of the first piston means, said additional piston means engaging said first piston means, both of said pistons being arranged to be movable together when in engagement; additional passage means for applying fluid from said conductor at the inlet side of said flow restrictor to said one end of said additional piston means to oppose movement of said first piston means by the pressure from the conductor at the inlet side of said flow restrictor; a pressure indicating means connected with said additional passage means; means forming an exhaust passage; and a metering valve controlled by the movement of said first piston means to connect alternately said additional passage means with said conductor and said exhaust passage means.

2. In apparatus for measuring the differential in pressure on opposite sides of a restriction in a fluid conductor comprising a double-ended movable piston assembly having an area of predetermined size at one end exposed to the pressure in said conductor at the inlet side of said restriction; said piston assembly having separated end areas at the other end each of which is equal to the first-mentioned end area, one of said latter end areas being exposed to the pressure in said conductor at the outlet side of said restriction; passage means for applying fluid from said conductor at the inlet side of said restriction to the other of said separated end areas to oppose movement of said piston assembly by the fluid pressure applied to said first-mentioned end, said piston assembly being movable in one direction or another according to whether the force due to pressure at said one end is greater or less than the force due to pressure at the said other end; and a metering valve responsive to the movement of said piston assembly in said one direction to connect the inlet pressure in said conductor to said passage means when the force exerted by pressure at the said end by fluid pressure is greater than the force due to pressure at the said other end, and to exhaust said passage to a region of lower pressure when the piston assembly movement is in said other direction.

3. In an apparatus for measuring the differential in pressure on opposite sides of a restriction in a fluid conductor, a double-ended movable piston assembly having an area at one end exposed to the pressure in said conductor at the inlet side of said restriction; said piston assembly having two separated end areas at its opposite end, one of said latter end areas being exposed to the pressure in said conductor at the outlet side of said restriction; passage means for conducting fluid pressure from said conductor at the inlet side of said restriction to the other of said separated end areas to oppose movement of said piston assembly by the fluid pressure applied to said first-mentioned end; means for connecting a pressure indicating means with said passage means; means forming an exhaust passage, and a metering valve responsive to the movement of said piston assembly to connect alternately said passage means with said conductor and said exhaust passage means.

4. Apparatus for measuring a pressure drop caused by a restrictor in a fluid conductor including a conductor for fluid; means forming a restriction in said conductor; a double-ended piston disposed for longitudinal reciprocation; a pair of double-ended pistons disposed for reciprocation in parallel relation to said first piston, one end of each piston of said pair of pistons engaging one end of said first piston, said first piston being exposed at its other end to pressure in said conductor at the inlet side of said restrictor, the other end of one piston of said pair of pistons being exposed to pressure in said conductor at the outlet side of said restrictor; valve means responsive to the movement of said pistons to control alternately the exposure of the other end of the second piston of said pair of pistons with pressure in said conductor at the inlet side of said restrictor and with a region of lower pressure; and gage means exposed to the pressure applied to said second piston of said pair of pistons.

5. In apparatus for measuring the difference in fluid pressures in a region of high pressure and a region of lower pressure, said apparatus comprising a double-ended movable piston assembly having an area of predetermined size at one end exposed to the pressure in said high pressure region; said piston assembly having separated end areas at the other end each of which is equal to the first-mentioned end area, one of said latter end areas being exposed to the pressure in said region of lower pressure; passage means for applying fluid from said region of high pressure to the other of said separated end areas to oppose movement of said piston assembly by the fluid pressure applied to said first-mentioned end, said piston assembly being movable in one direction or another according to whether the force due to pressure at said one end is greater or less than the force due to pressure at the said other end; and a metering valve responsive to the movement of said piston assembly in said one direction to connect the inlet pressure in said conductor to said passage means when the force exerted by pressure at the said end by fluid pressure is greater than the force due to pressure at the said other end, and to exhaust said passage to a region of lower pressure when the piston assembly movement is in said other direction.

References Cited in the file of this patent

UNITED STATES PATENTS

| 1,935,508 | Lanham | Nov. 14, 1933 |
| 2,406,181 | Wiegand | Aug. 20, 1946 |
| 2,641,105 | Drake | June 9, 1953 |

OTHER REFERENCES

Ludwig: Archiv fur Technisches Messen, May 1951, page T57.